(12) United States Patent
Garrido et al.

(10) Patent No.: US 11,986,998 B2
(45) Date of Patent: May 21, 2024

(54) THERMAL CONTROL FOR APPARATUS FOR THE MANUFACTURE OF THREE-DIMENSIONAL OBJECTS

(71) Applicant: Stratasys Powder Production Ltd., London (GB)

(72) Inventors: Marcel Garrido, London (GB); Anders Hartmann, London (GB); Gianluca Dorini, London (GB); Simon Bak, London (GB); Hans Niels-Christiansen, London (GB)

(73) Assignee: Stratasys Powder Production Ltd., London (GB)

( * ) Notice: Subject to any disclaimer, the term of this patent is extended or adjusted under 35 U.S.C. 154(b) by 0 days.

(21) Appl. No.: 17/782,817

(22) PCT Filed: Dec. 3, 2020

(86) PCT No.: PCT/GB2020/053100
§ 371 (c)(1),
(2) Date: Jun. 6, 2022

(87) PCT Pub. No.: WO2021/111136
PCT Pub. Date: Jun. 10, 2021

(65) Prior Publication Data
US 2023/0001635 A1    Jan. 5, 2023

(30) Foreign Application Priority Data

Dec. 5, 2019 (GB) ...................................... 1917823

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/209* (2017.08); *B29C 64/264* (2017.08);
(Continued)

(58) Field of Classification Search
CPC ... B29C 64/165; B29C 64/209; B29C 64/264; B29C 64/364; B29C 64/393;
(Continued)

(56) References Cited

U.S. PATENT DOCUMENTS 9,776,362 B2    10/2017  Chuang et al.
11,007,716 B2 *  5/2021  Gasso ................... B29C 64/307
(Continued)

FOREIGN PATENT DOCUMENTS

EP          3323597 A1    5/2018
WO      2017/108019 A1    6/2017
(Continued)

*Primary Examiner* — Nahida Sultana
(74) *Attorney, Agent, or Firm* — Honigman LLP; Eric J. Sosenko; Jonathan P. O'Brien

(57) ABSTRACT

An apparatus (1) for manufacturing a three-dimensional object from particulate material, the apparatus comprising: • a work space (100) bounded by a first side wall (100A) on a first side of the work space, and a second side wall (100B) on a second side of the work space, the first side wall opposing the second side wall; • a build bed (170) having a build bed surface (160), the build bed surface being comprised in the floor of the work space and having a first edge (160') on the first side of the work space, towards the first side wall, and a second edge (160") on the second side of the work space, towards the second side wall; • a first gas inlet (101A) at or near the first side wall; • a second gas inlet (101B) at or near the second side wall; • a first gas outlet (102A) above the floor (100C) of the work space, the position of the first gas outlet being coincident with the first edge of the build bed surface, or between the first edge of the build bed surface and the first gas inlet; and • a second gas
(Continued)

outlet (102B) above the floor of the work space, the position of the second gas outlet being coincident with the second edge of the build bed surface, or between the second edge of the build bed surface and the second gas inlet; • wherein the first gas outlet is positioned higher in the work space than the first gas inlet, and the second gas outlet is positioned higher in the work space than the second gas inlet; and • wherein one or more flow devices (210, 211, 212) are operable to create first and second gas flows between the first gas inlet and the first gas outlet, and between the second gas inlet and the second gas outlet, respectively, such as to create respective first and second gas curtains on the first and second sides of the work space in use.

20 Claims, 13 Drawing Sheets

(51) Int. Cl.
| | | |
|---|---|---|
| *B29C 64/264* | (2017.01) | |
| *B29C 64/364* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/364* (2017.08); *B29C 64/393* (2017.08); *B33Y 10/00* (2014.12); *B33Y 30/00* (2014.12); *B33Y 50/02* (2014.12)

(58) Field of Classification Search
CPC ................. B29C 64/25; B29C 64/153; B29C 2035/1658; B33Y 10/00; B33Y 30/00; B33Y 50/02; B33Y 40/00; Y02P 10/25; B22F 10/28; B22F 10/322; B22F 12/70
See application file for complete search history.

(56) References Cited

U.S. PATENT DOCUMENTS

| | | |
|---|---|---|
| 2015/0266238 A1 | 9/2015 | Ederer et al. |
| 2016/0228918 A1* | 8/2016 | She .................. B29C 64/314 |
| 2019/0232429 A1* | 8/2019 | Buller ................ B23K 26/123 |
| 2019/0262901 A1* | 8/2019 | Huebinger ............ B29C 64/371 |
| 2019/0322050 A1* | 10/2019 | Connell ................ B29C 64/371 |
| 2019/0322051 A1 | 10/2019 | Wakelam et al. |
| 2020/0061655 A1* | 2/2020 | Wakelam ................ B05B 12/32 |
| 2020/0061656 A1* | 2/2020 | Shalaby .................. B22F 10/77 |
| 2020/0078864 A1 | 3/2020 | Mehl |
| 2021/0046519 A1* | 2/2021 | Go .......................... B33Y 40/20 |
| 2022/0143703 A1* | 5/2022 | Chanclon Fernandez ................... B33Y 40/20 |
| 2022/0362995 A1* | 11/2022 | Patel ..................... B29C 64/264 |
| 2023/0142837 A1* | 5/2023 | Garrido Barrabes .. B33Y 40/00 264/510 |

FOREIGN PATENT DOCUMENTS

| | | |
|---|---|---|
| WO | 2017/196334 A1 | 11/2017 |
| WO | 2018/147868 A1 | 8/2018 |
| WO | 2019/209282 A1 | 10/2019 |
| WO | 2020/068075 A1 | 4/2020 |

* cited by examiner

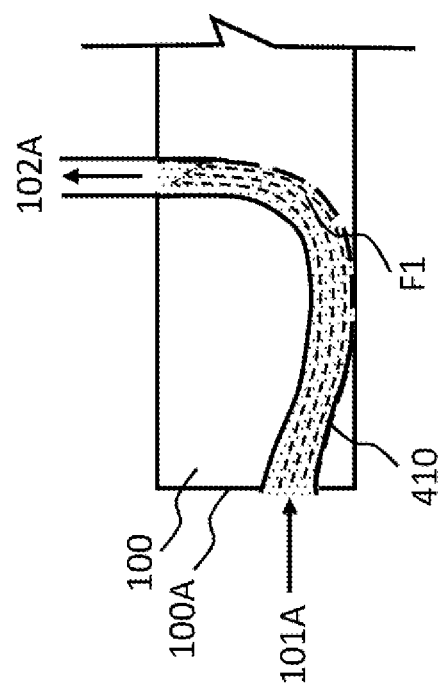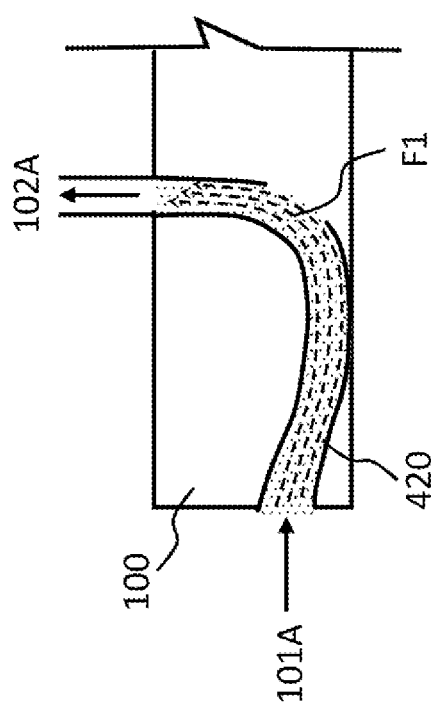

THERMAL CONTROL FOR APPARATUS FOR THE MANUFACTURE OF THREE-DIMENSIONAL OBJECTS

FIELD OF INVENTION

The present disclosure relates to an apparatus for manufacturing a three-dimensional object from particulate material and a method thereof, capable of improving thermal control.

BACKGROUND

In three-dimensional printing technology, three-dimensional objects can be formed in a layer-wise manner using known methods or processes of manufacturing, such as selective laser sintering, selective laser melting, electron beam melting and high speed sintering. In these processes, layers of particulate material are successively spread on a build bed surface of a build bed, and portions of successive layers are selectively solidified to form the layers of the three-dimensional object. Each layer of particulate material is selectively fused, sintered or melted by applying energy, heat or radiation, so that layer-by-layer the three-dimensional object is formed.

During a typical build process, the temperature of the build bed and temperature of the components within the work space is prone to fluctuate, for example due to one or more of (a) a sintering lamp being applied intermittently across the build bed surface, leading to hot and cold periods; (b) a new (cooler) layer of particulate material being applied; (c) a preheat lamp being applied intermittently across the build bed surface; and (d) carriages on which a powder distribution device, printheads or lamps are mounted, comprising a hot surface and also shielding the build bed surface intermittently from an overhead heater, passing across the build bed surface. While such an overhead heater may be used to dynamically compensate for such thermal fluctuations, it cannot actively cool the build bed surface, and an additional level of thermal control is desirable.

Insufficient temperature control may lead to a lack of control of the build bed temperature which may result in warpage, shrinkage or curling of the three-dimensional object due to thermal effects. Therefore, to control the temperature of the layer and/or build bed surface and in turn to control the temperature of the build bed, it is desirable to remove excess heat from the apparatus in which the three-dimensional object is being built.

Furthermore, by-products such as airborne particles, smoke, dust or fumes may be formed in a work space during the three-dimensional printing process, and it is desirable to remove these from the work space so as to avoid their build up within the work space environment.

SUMMARY

Aspects of the invention are set out in the appended independent claims, while particular embodiments of the invention are set out in the appended dependent claims.

The following disclosure describes, according to a first aspect of the invention, an apparatus for manufacturing a three-dimensional object from particulate material, the apparatus comprising: a work space bounded by a first side wall on a first side of the work space, and a second side wall on a second side of the work space, the first side wall opposing the second side wall; a build bed having a build bed surface, the build bed surface being comprised in the floor of the work space and having a first edge on the first side of the work space, towards the first side wall, and a second edge on the second side of the work space, towards the second side wall; a first gas inlet at or near the first side wall; a second gas inlet at or near the second side wall; a first gas outlet above the floor of the work space, the position of the first gas outlet being coincident with the first edge of the build bed surface, or between the first edge of the build bed surface and the first gas inlet; and a second gas outlet above the floor of the work space, the position of the second gas outlet being coincident with the second edge of the build bed surface, or between the second edge of the build bed surface and the second gas inlet; wherein the first gas outlet is positioned higher in the work space than the first gas inlet, and the second gas outlet is positioned higher in the work space than the second gas inlet; and wherein one or more flow devices are operable to create first and second gas flows between the first gas inlet and the first gas outlet, and between the second gas inlet and the second gas outlet, respectively, such as to create respective first and second gas curtains on the first and second sides of the work space in use.

By virtue of the above arrangement of the first and second gas inlets and the first and second gas outlets, and as a consequence of the first and second gas curtains thus created on either side of the work space (the first and second gas curtains being outward from, or potentially aligned with, the first and second edges of the build bed surface), improved thermal control may be achieved during the manufacture of three-dimensional objects within the work space. Improved efficiency of removal of airborne species (e.g. particles, chemical substances, impurities, smoke, fumes, exhaust gases etc.) from above the build bed surface may also be realised.

According to a second aspect of the invention, there is provided a method for manufacturing a three-dimensional object from particulate material, the method being performed using the apparatus according to the first aspect of the invention, and comprising: operating the one or more flow devices to create first and second gas flows between the first gas inlet and the first gas outlet, and between the second gas inlet and the second gas outlet, respectively, such as to create the respective first and second gas curtains on the first and second sides of the work space.

BRIEF DESCRIPTION OF THE DRAWINGS

Reference is now directed to the drawings, in which:

FIG. 10A-10B are schematic cross-sectional views of the first side of the work space, with alternative arrangements of guiding elements.

In the Figures, like elements are indicated by like reference numerals throughout. It should be noted that the drawings are not to scale and that certain features may be shown with exaggerated sizes so that these are more clearly visible.

DETAILED DESCRIPTION

The apparatus and method of the present disclosure enable improved thermal control during the manufacture of three-dimensional objects. Improved efficiency of removal of airborne species (e.g. particles, chemical substances, impurities such as evaporating fluid agent, smoke, fumes, exhaust gases, etc.) from the apparatus may also be achieved.

Figure 2:
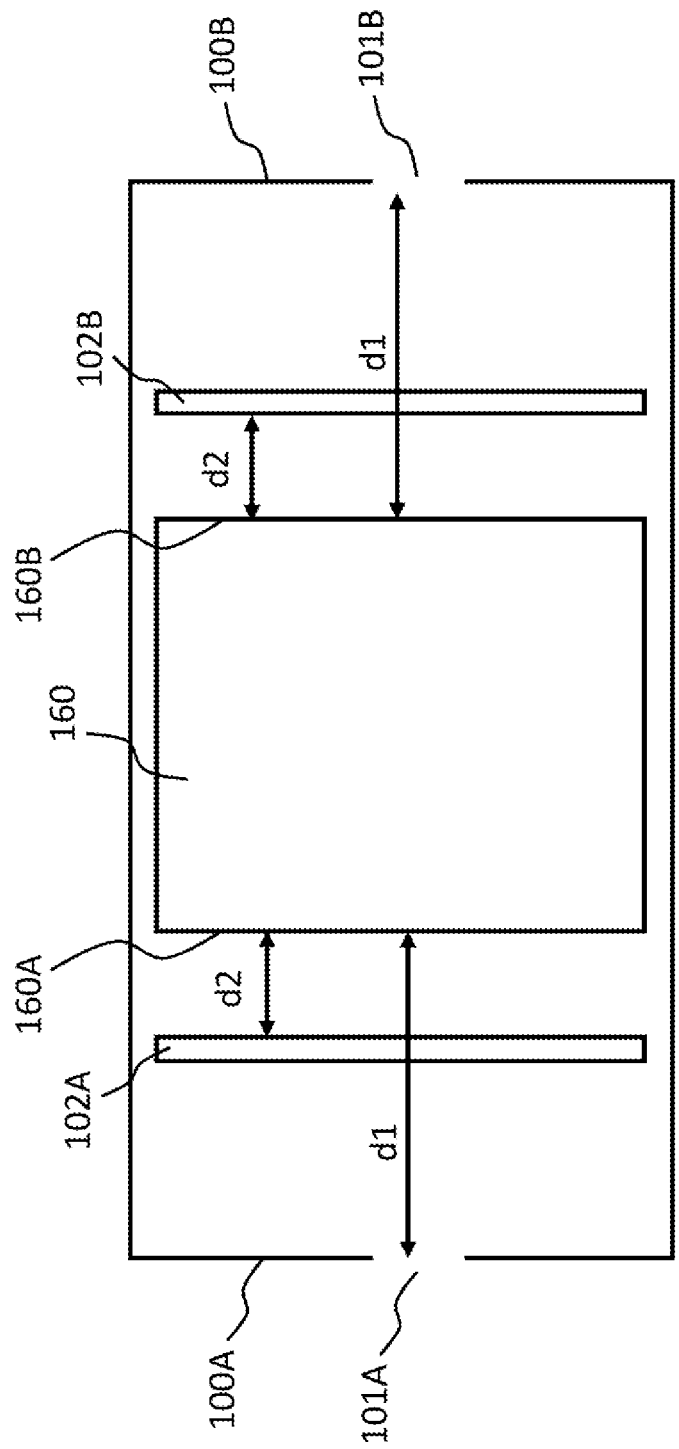
FIG. 2 is a plan view from above of the build bed, gas inlets and gas outlets within an apparatus such as that of FIG. 1.

By way of an initial overview, the present disclosure provides apparatus comprising a first gas inlet and a second gas inlet, respectively on first and second sides of the work space, away from the build bed surface; and first and second gas outlets above the floor of the work space, respectively on the first and second sides of the work space, and positioned such that they are closer to the build bed surface than to the first and second gas inlets when viewed from above. This is illustrated in FIG. 2 which shows a plan view of the work space 100, first and second gas inlets 101A and 101B, and first and second gas outlets 102A and 102B, looking down from above. As shown in FIG. 2, the distance between the build bed surface 160 and each of the first and second gas inlets 101A, 101B is depicted as "d1", while the distance between the build bed surface 160 and each of the first and second gas outlets 102A, 102B is depicted as "d2". The gas inlets 101A, 101B and the gas outlets 102A, 102B are arranged with respect to the build bed surface such that the distance "d1" is greater than distance "d2" (i.e. d1>d2). Further, the first and second gas outlets 102A, 102B may be coincident with respective first and second sides 160A, 160B of the build bed surface 160 (i.e. such that d2=0), or may be located between the respective first and second sides 160A, 160B of the build bed surface 160 and the respective first and second gas inlets 101A, 101B (i.e. such that 0<d2<d1). In such arrangements, the gas flow is not directed at the build bed surface 160, preventing direct impact of gas flow on the build bed surface 160 and hence avoiding any resulting thermal non-uniformities. However, the gas flow assists in cooling the build bed surface 160 and removing any airborne species.

Moreover, the present apparatus and method ensure that the gas flow or a ventilation flow passes across the work space before the flow is extracted, particularly engaging with hot areas of the work space and removing heat from them.

Reference will now be made in detail to the embodiments, examples of which are illustrated in the accompanying drawings.

Apparatus Overview

Figure 1:
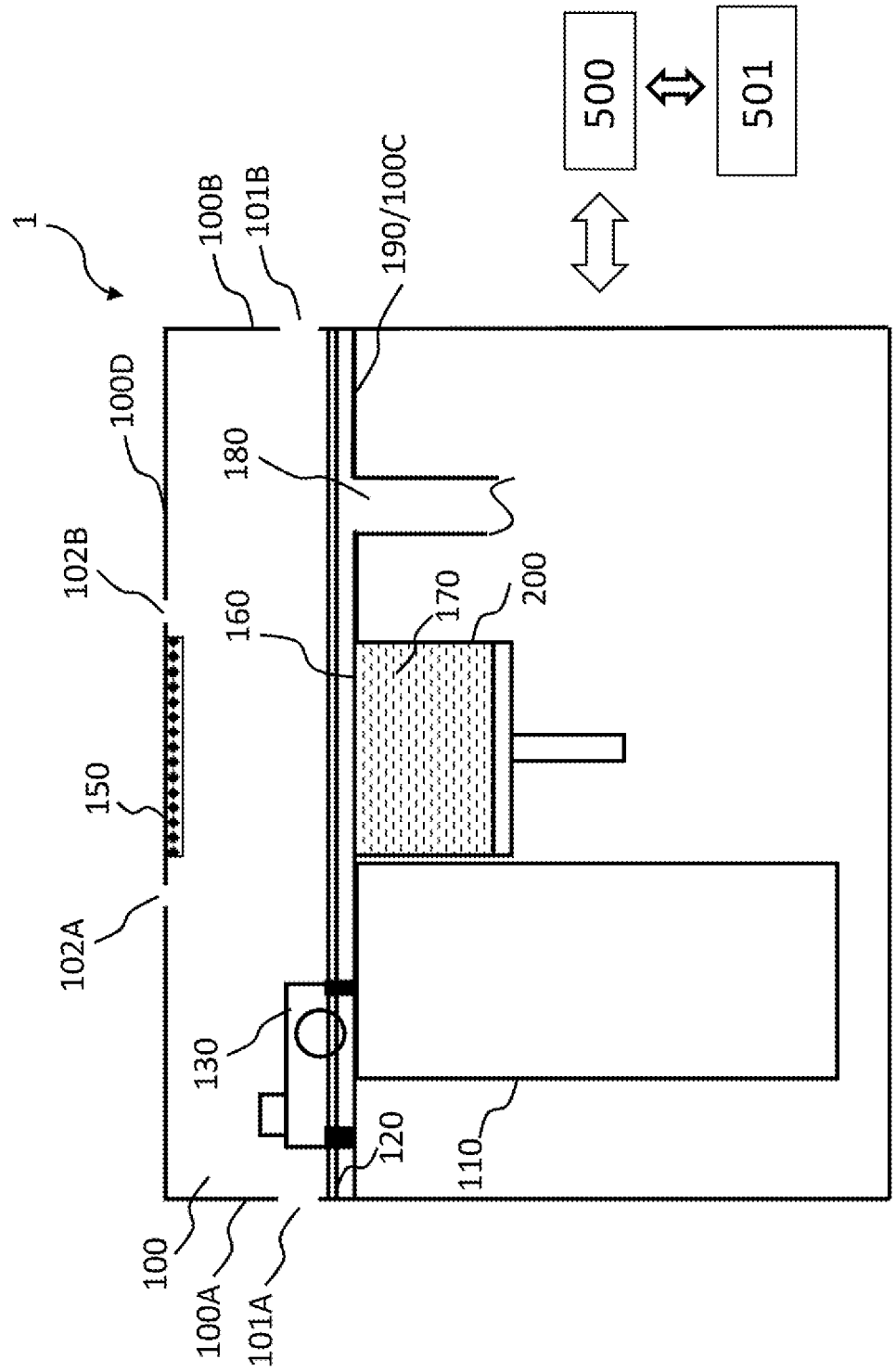
FIG. 1 is a schematic cross-sectional diagram of an apparatus for layer-by-layer formation of three-dimensional objects according to an embodiment of the invention, including a work space, a build bed, first and second gas inlets, and first and second gas outlets.

FIG. 1 schematically illustrates a front view of an apparatus 1 for the manufacture of three-dimensional objects. The apparatus 1 is operable to fabricate three-dimensional objects from a particulate material, and includes a supply module 110 for storing the particulate material, a work space 100 bounded by a first side wall 100A on a first side of the work space 100, a second side wall 100B on a second side of the work space 100 (the second side opposing the first side), a floor 100C on a bottom side of the work space 100 and a ceiling 100D on a top side of the work space 100. The apparatus 1 further comprises a work surface 190 comprising a build bed surface 160 provided at the top of a build bed 170 which is within a build chamber 200 wherein successive layers of the three-dimensional object are formed; a distribution sled 130 operable to distribute a layer of particulate material within the build bed surface 160; and one or more radiation source assemblies such as overhead radiation source assembly 150 and/or a traversing radiation source assembly (not shown), such as an electromagnetic radiation source assembly to preheat and/or to sinter the particulate material or alternatively a laser source (not shown), to sinter the particulate material to form each layer of the object. The work space 100 includes the work surface 190, the distribution sled 130, the build bed surface 160 and the overhead radiation source assembly 150.

The apparatus 1 may be a high speed sintering apparatus, and may further comprise a print sled operable to print (by means of one or more droplet deposition heads) a fluid pattern comprising radiation absorbing material (RAM) to define the cross-section of the three-dimensional object to be manufactured in that layer of particulate material.

As shown in FIG. 1, the distribution sled 130 comprises bearings mounted on rails 120. The rails 120 suspend the sled 130 above the work surface 190 of the apparatus 1. The overhead radiation source assembly 150, such as a ceramic heater, may be provided above the build bed surface 160.

The apparatus 1 further comprises a first gas inlet 101A at or near the first side wall 100A, a second gas inlet 101B at or near the second side wall 100B, and a first gas outlet 102A and a second gas outlet 102B above the floor 100C of the work space 100.

It should be noted that the first side wall 100A and the second side wall 100B are depicted in the figures as being the side walls of a housing defining the work space, but this is merely for illustrative purposes and for ease of understanding the invention. The invention is not limited to this, and the first side wall 100A and/or the second side wall 100B may instead be partial or full walls arranged inwardly from the walls of the housing itself. Moreover, the first side wall 100A and/or the second side wall 100B may be hollow walls and the first and/or second gas inlets 101A, 101B may be formed within those hollow walls.

Further, the expression "at or near" in this disclosure should be interpreted broadly, to encompass all possible arrangements of the gas inlets in proximity to the side walls. For example, the gas inlet could be "at" the side wall—e.g. the gas inlet may protrude as a nozzle from the side wall, or may be provided as a nozzle between the side wall and the ceiling of the work space. Alternatively, the gas inlet(s) may be "in" the side wall—for example, the gas inlet may be an opening or hole in the side wall. In a further alternative, the gas inlet may be "near" the side wall—for example, the gas inlet may be an outlet of a flexible or a rigid pipe or tube which may be suspended from the ceiling of the work space near the side wall, or may be otherwise positioned between the side wall and the ceiling of the work space.

Figure 3:
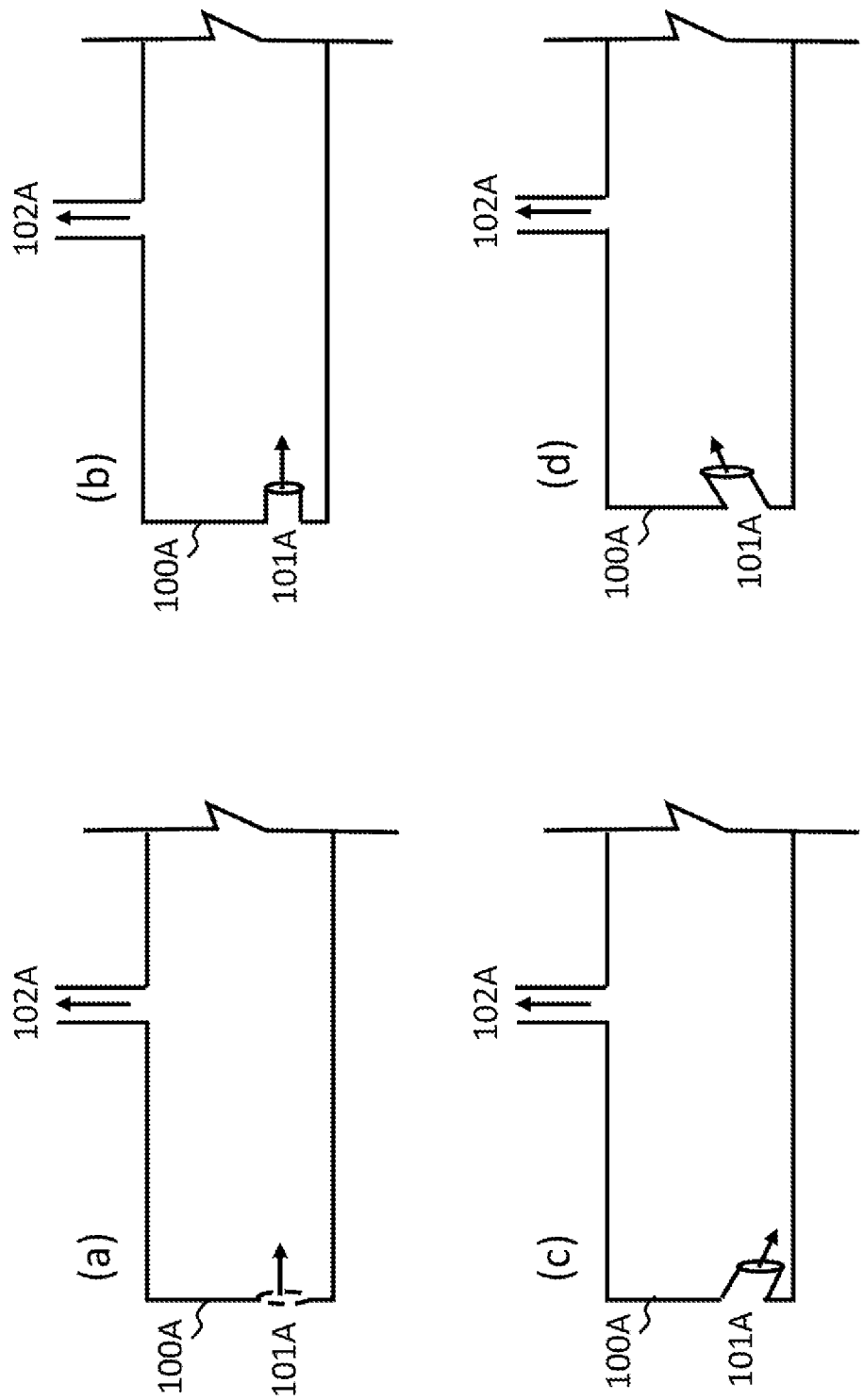
FIGS. 3(a)-(h) are schematic cross-sectional views of a first side of a work space such as that of FIG. 1, showing alternative arrangements and geometries of the first gas inlet.
Figure 3:
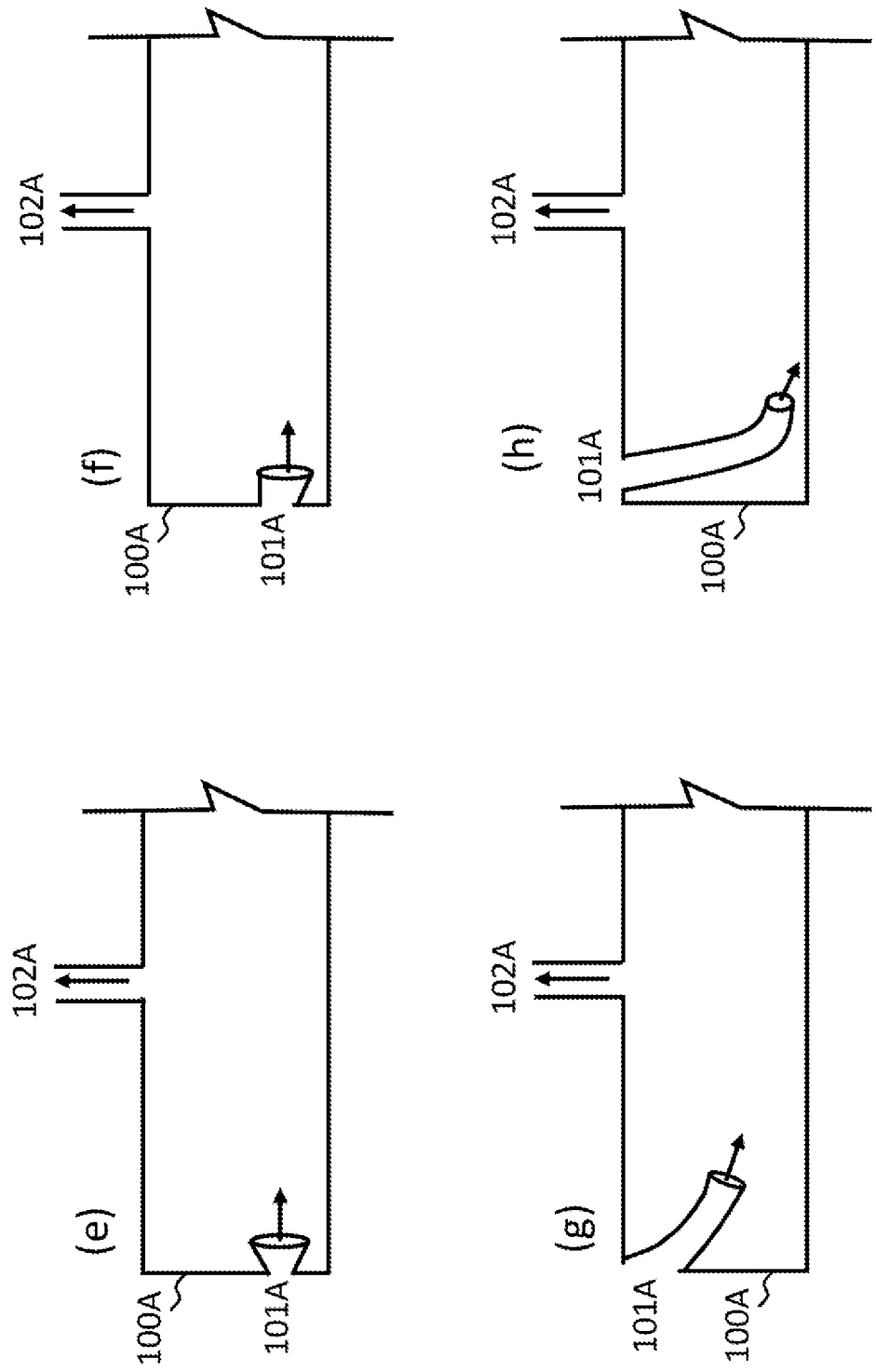

To illustrate this, FIGS. 3(*a*) to 3(*h*) depict cross-sectional views of the first side 100A of the work space, and illustrate various possible arrangements and geometries of the gas inlet 101A. It should of course be appreciated that FIGS. 3(*a*)-(*h*) depict only one side of the work space; the other side of the work space may be (but need not be) a mirror image of the shown side of the work space. The first and second gas outlets 102A, 102B may have any of the configurations shown in FIGS. 3(*a*)-(*h*), or variants thereof. Both the outlets may have the same configuration, or may have different configurations.

In more detail, FIG. 3(*a*) shows a gas inlet 101A as an aperture or a hole in the side wall 100A. Alternatively, the or each gas inlet may comprise a nozzle at the side wall. For example, FIGS. 3(*b*) to 3(*f*) depict a gas inlet 101A as a nozzle protruding from the first side wall 100A into the first side of the work space.

In one variant the gas inlet 101A may be directed horizontally, parallel to the floor 100C of the work space 100, as shown in FIG. 3(*b*), so that the gas flow enters the work space parallel to the build bed surface.

In another variant, as shown in FIG. 3(*c*), the first and second gas inlets 101A, 101B may be angled downwards, towards the floor 100C of the work space 100, so as to direct the gas flow such that the gas flow is deflected by the floor 100C of the work space 100 towards the first gas outlet 102A and the second gas outlet 102B respectively. This may be advantageous as the gas flow is projected towards the floor of the work space, thereby covering, before extraction, a greater distance at the level of the build bed surface than with the arrangement shown in FIG. 3(*b*), thereby more effectively extracting heat from the work space.

In another variant, as shown in FIG. 3(*d*), the first and second gas inlets 101A, 101B may be angled upwards towards the ceiling 100D of the work space 100, so as to direct the gas flow more directly towards the first gas outlet 102A and the second gas outlet 102B, thereby directing the gas flow towards hot areas of the work space 100. Such hot areas may for example be the ceiling of the work space, the areas within the work space where the radiation source assembly is located (e.g. on sleds), or the areas within the work space which may be more likely impacted by heat or may be more prone to generated heat within the work space.

In variants where the first and/or second gas inlet is configured as a nozzle or a pipe, the nozzle or the pipe may be adjustably mounted, to enable the user to select the angle of the first and/or second gas inlet and thus the angle at which the gas flow will initially be directed.

In both the above arrangements of the first and second gas inlets 101A, 101B, the first and second gas outlets 102A, 102B may be angled such that the gas flow between the inlets and the outlets is as smooth as possible, with a non-turbulent overall line of gas flow.

It will be appreciated that the shape of the first and second gas inlets 101A, 101B is not limited to being circular. Instead, they may have any other shape, e.g. hexagonal, square, rectangular, tetragonal, polygonal etc. For example, the gas inlet may be conical and may have a tapered inlet as shown in FIG. 3(*e*) such that it spreads out the gas flow as it enters the work space. Alternatively the gas inlet may have an asymmetric shape, e.g. as shown in FIG. 3(*f*), or the gas inlets may for instance be elongate slots. Moreover, the first and second inlets may be of any size—and may be the same size or different sizes as required. Further, the gas inlets 101A, 101B and/or the gas outlets 102A, 102B may be of similar or dissimilar geometries.

In other variants the first and second gas inlets 101A, 101B may comprise an elongated nozzle, a tube or a pipe through which gas may enter the work space. For example, the gas inlet 101A may be an elongate nozzle arranged between the side wall 100A and the ceiling 100D of the work space 100 as shown in FIG. 3(*g*), or the gas inlet 101A may be a flexible or a rigid pipe that may be suspended from the ceiling 100D of the work space 100 as shown in FIG. 3(*h*). FIGS. 3(*a*)-3(*h*) are only examples illustrating different types of inlet or outlet geometry (in all cases with the inlet 101A being "at or near" the side wall 100A), and an appropriate inlet or outlet geometry can be chosen according to the work space dimensions and design. Further, one or more gas outlets may be arranged at a right angle, an acute angle or an obtuse angle with respect to the ceiling of the work space. For example, the outlet could face sidewards towards the side wall comprising the respective gas inlet, or alternatively sidewards towards the opposite side wall of the work space.

Referring back to FIG. 1, in an example process sequence, at the start of a cycle, a layer of particulate material is distributed on the build bed surface 160 by the distribution sled 130. Any excess particulate material is fed into a return outlet 180 to recirculate into the system or to collect in an external container. A fluid such as radiation absorbing material (RAM) is then deposited onto the layer of particulate material by a print sled (not shown), to define the cross-section of the three-dimensional object 300 to be manufactured in that layer, and the build bed surface 160 is then exposed to radiation from a radiation source assembly to sinter the powder. Following sintering, the build bed surface 160 is lowered by a layer thickness; this is considered to be the end of the cycle. The next cycle begins with depositing another layer of the particulate material on the build bed surface 160, and the process is repeated until the desired three-dimensional product has been fabricated.

Implementations

Figure 4:
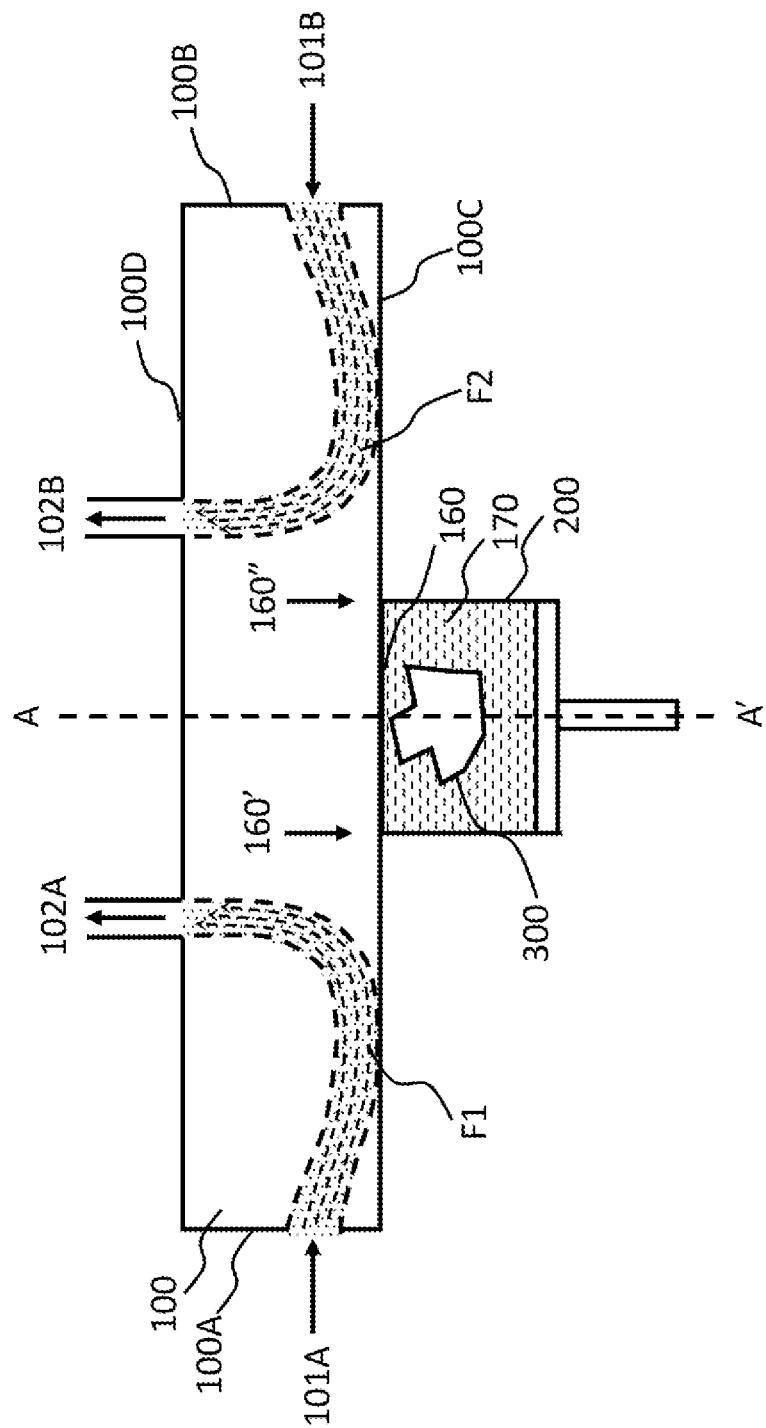
FIG. 4 is a schematic cross-sectional view of a build bed and a work space of an apparatus such as that of FIG. 1, showing gas curtains formed on first and second sides of the work space.

FIG. 4 shows a schematic cross section of a build bed and a work space of an apparatus such as that of FIG. 1. In FIG. 4, a first edge of the build bed surface 160 is shown as 160' while a second edge of the build bed surface 160 is shown as 160". The edges of the build bed surface define a boundary of the build bed surface.

As shown in FIG. 4, the line A-A' indicates a section through the build bed 170 (into the page). In the present disclosure, the sides of the work space are considered with respect to the section A-A' of the build bed 170. Thus, a first side of the work space is the side which is to the left of the section A-A', whereas a second side of the work space is the side that is to the right of the section A-A'.

It will also be appreciated that references to "left" and "right", "first side" and "second side" herein are merely for ease of understanding with respect to the drawings, and that mirror-image versions of the present apparatus and methods can be made in which the concepts of "left" and "right", or "first side" and "second side", are essentially reversed.

As illustrated in FIG. 4, the first side wall 100A on the first side of the work space 100 is opposite the second side wall 100B on the second side of the work space 100, and the first gas inlet 101A and the second gas inlet 101B are respectively positioned at or near the first and second side walls 100A, 100B. Further, the first gas outlet 102A is positioned above the floor of the work space, the position of the first gas outlet 102A being coincident with the first edge 160' of the build bed surface 160, or between the first edge 160' of the build bed surface 160 and the first gas inlet 101A when viewed from above, in plan view. The second gas outlet 102B is positioned above the floor of the work space, the position of the second gas outlet 102B being coincident with the second edge 160" of the build bed surface 160, or being between the second edge 160" of the build bed surface 160 and the second gas inlet 101B when viewed from above, in plan view. This positioning of the first and second gas outlets 102A, 102B may ensure that the gas flow does not disturb the particulate material on the build bed surface 160 and does not cause any dust and/or thermal non-uniformities.

The apparatus 1 further comprises one or more flow devices that are operable to create a first gas flow F1 between the first gas inlet 101A and the first gas outlet 102A, and a second gas flow F2 between the second gas inlet 101B and the second gas outlet 102B, such as to create respective first and second gas curtains on the first and second sides of the work space 100 in use.

The first gas inlet 101A and the first gas outlet 102A are positioned on the first side of the work space 100 and the second gas inlet 101B and the second gas outlet 102B are positioned on the second side of the work space 100 such that the first gas flow F1 from the first gas inlet 101A is directed towards the first gas outlet 102A and the second gas flow F2 from the second gas inlet 101B is directed towards the second gas outlet 102B without crossing the build bed surface 160.

The gas flow between the first and second gas inlets 101A, 101B and the respective first and second gas outlets 102A, 102B is created by suction generated at the first and second gas outlets 102A, 102B. The rate of extraction of the gas by the suction determines the trajectory and temperature of the gas flow, and is used to create the gas curtains on the first and second sides of the work space 100. The first gas curtain is due to the first gas flow F1 from the first gas inlet 101A to the first gas outlet 102A on the first side of the work space 100, and the second gas curtain is due to the second gas flow F2 from the second gas inlet 101B to the second gas outlet 102B on the second side of the work space 100, as shown in FIG. 4. The first gas curtain (due to the first gas flow F1) is formed outward of the first edge 160' of the build bed surface 160, or potentially may be aligned with the first edge 160' of the build bed surface 160. The second gas curtain (due to the second gas flow F2) is formed outward of the second edge 160" of the build bed surface 160, or potentially may be aligned with the second edge 160" of the build bed surface 160.

As depicted in FIG. 4, the first and second gas outlets 102A, 102B may be located in the ceiling 100D of the work space 100 and the first and second gas inlets 101A, 101B may be oriented horizontally, substantially parallel to the build bed surface 160, or parallel to the floor 100C of the work space 100. Further, the first gas outlet 102A is positioned higher in the work space 100 than the first gas inlet 101A, and the second gas outlet 102B is positioned higher in the work space 100 than the second gas inlet 101B. The by-products such as dust and fumes of the three-dimensional printing process have a tendency to move upwards, hence this arrangement of gas inlets 101A, 101B and gas outlets 102A, 102B is useful to catch those by-products effectively. Along with the adjustment the flow rate of the flow devices, the gas inlets 101A, 101B and gas outlets 102A, 102B may be arranged in close proximity or the vertical distance between them may be adjusted such that the created first and second gas curtains may be as parallel as possible to the floor 100C of the work space 100, or as perpendicular as possible to the plane of the build bed surface 160 or to the floor 100C of the work space 100.

Further, the first gas inlet 101A and the second gas inlet 101B may be positioned at the same height as one another with respect to the floor 100C of the work space 100, or may be located at different heights. However, in some implementations it may be desirable to provide a symmetric arrangement of the first and second gas inlets 101A, 101B about the intersection A-A', and to have the first and second gas inlets 101A, 101B positioned at the same height and at the same distance from the intersection A-A'.

In some implementations the first and second gas outlets 102A, 102B may be arranged facing downwards towards the floor 100C of the work space 100 or towards the work surface 190. The first and second gas outlets 102A, 102B may be at right angles to the ceiling of the work space 100. Alternatively, the first and second gas outlets 102A, 102B may be arranged at an acute or an obtuse angle with respect to the ceiling of the work space 100. The first and second gas outlets 102A, 102B may be arranged facing towards the first and second inlets 101A, 101B. It may be advantageous to position the first and second gas outlets 102A, 102B such that the gas flow between the first and second inlets and the first and second outlets describes a smooth line, so as to achieve smooth gas flow and less turbulence.

Furthermore, the first and the second gas outlets 102A, 102B may be arranged symmetric to the build bed, which may be advantageous for better thermal uniformity across the build bed surface 160. Alternatively, the first and second gas outlets 102A, 102B may be positioned asymmetrically about the section A-A', which may be beneficial when the three-dimensional objects being made are of small size and formed in the centre of the build bed, or only on one side of the build bed surface.

In one variant, the first and second gas outlets 102A, 102B may be positioned at the same height. In another variant, the first and second gas outlets 102A, 102B may be positioned at the different heights so as to cause different flow path geometry and different path lengths. In a further variant, more than one gas outlet may be provided at different heights on one side of the work space, with respect to the floor of the work space. However, for optimized gas flow conditions, the gas outlet is not provided at the same height as the respective gas inlet.

In presently-preferred embodiments the first and second gas outlets 102A, 102B are elongate slots, respectively extending along the length of (or parallel to) the first and second edges of the build bed surface 160 when viewed from above. The elongate slots create parallel gas curtains in the work space, thereby creating substantially parallel pressure zones outward of the first and second edges of the build bed surface 160. The cross-sectional area of the opening of each elongated slot may be smaller than the cross-sectional opening area of the first and/or second gas inlets.

Further, the gas flow provided at the first and second gas inlets may have a temperature lower than or equal to a temperature of the build bed surface 160 such that the gas flow cools the build bed surface by convection and helps to reduce temperature gradients.

Flow Devices

Figure 5A:
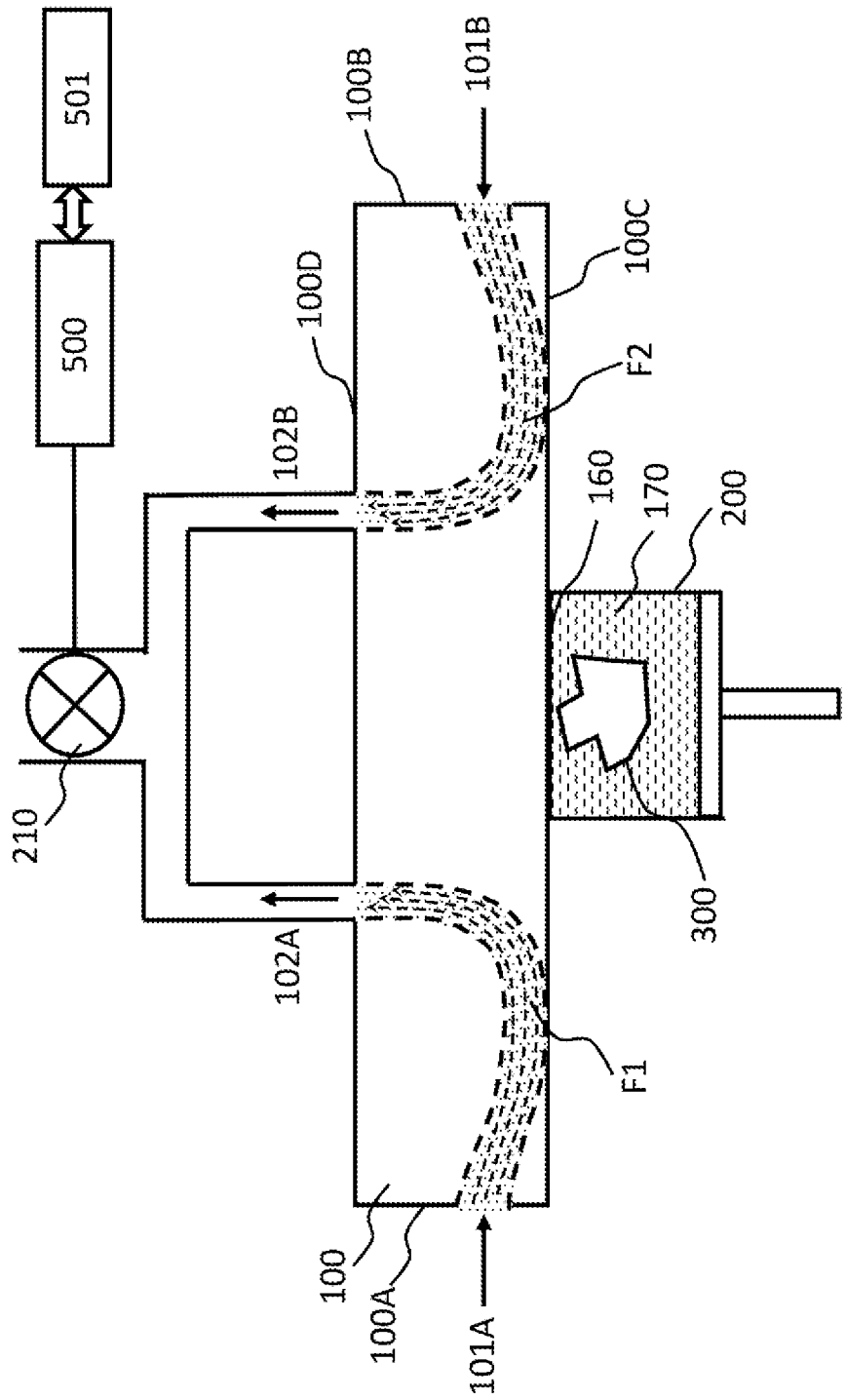
FIG. 5A is a schematic cross-sectional view of the build bed and work space as depicted in FIG. 4, together with an arrangement of a flow device that is coupled to both the first and second gas outlets.

In one embodiment, as shown in FIG. 5A, both the first gas outlet 102A and the second gas outlet 102B may be coupled to a common flow device or a common suction device 210. Thus, the flow device or suction device 210 is common to both the gas outlets 102A and 102B, and if the flow path is entirely symmetric having the same flow resistance, both the gas outlets will extract gas at the same gas flow rate and speed.

In another variant, instead of having a common flow device for the first and second gas outlets, a separate flow device may be provided for each of the first and second gas outlets 102A, 102B, such that apparatus 1 has more than one flow device or suction device. More particularly, a first flow device or suction device 211 may be coupled to the first gas outlet 102A, and a second flow device or suction device 212 may be coupled to the second gas outlet 102B. Providing independent flow devices in this manner may be useful to compensate for any asymmetry in the convection or to compensate for any asymmetry in the thermal process. For example, to compensate for thermal asymmetry, the gas flow rate or gas flow speed at one of the flow devices 102A or 102B may be altered or modified such that the resulting heat convection is the same on both sides of the work space. Furthermore, separate or independent flow devices may be used to create a differential flow in the two parts of the work space, on either side of the intersection A-A'. Further, with such an arrangement, it is possible to have flow paths having different flow resistances and the flow devices can be adjusted such that the gas outlets can extract gas at different gas flow rates and at different flow speeds.

Figure 5B:
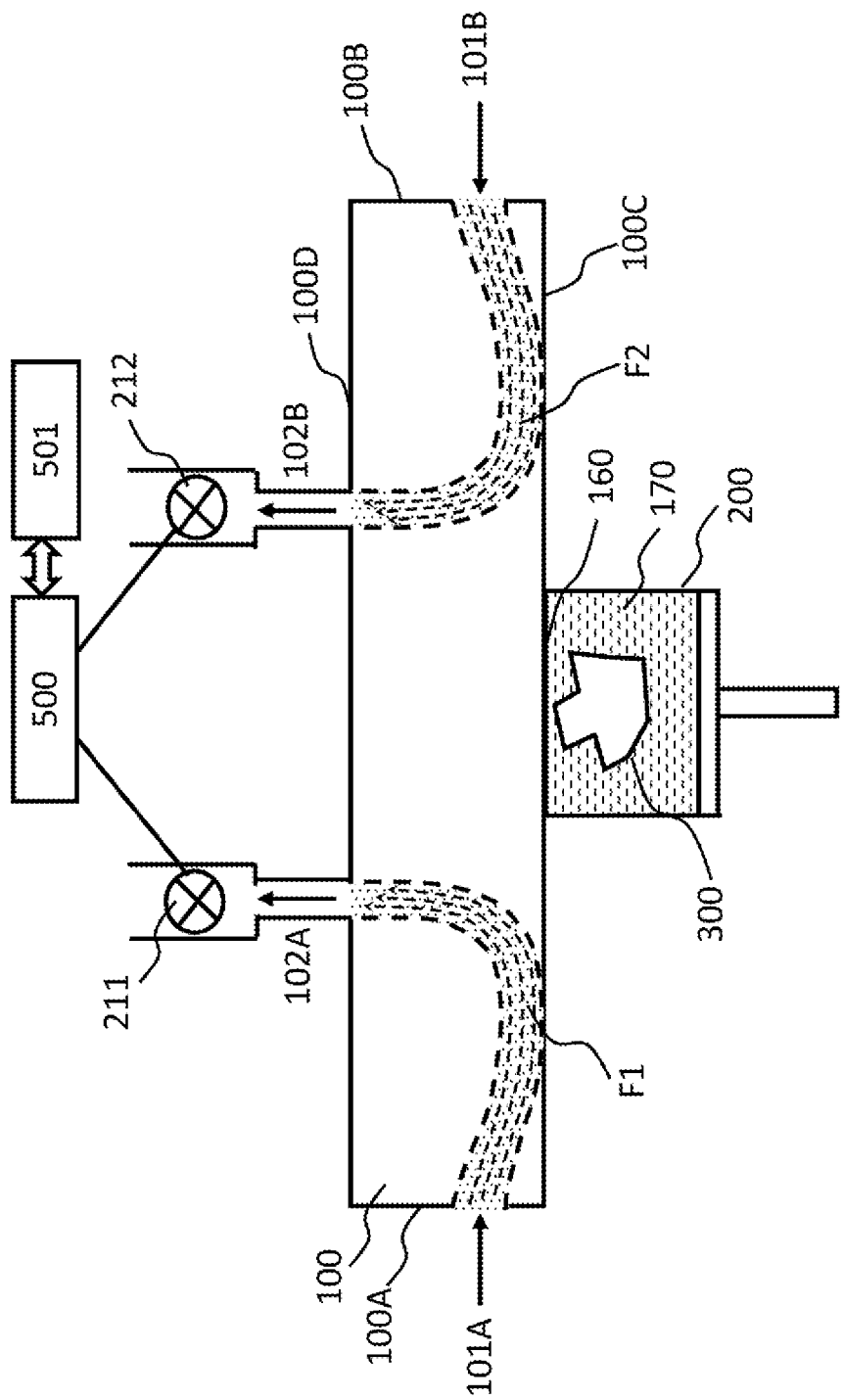
FIG. 5B is a schematic cross-sectional view of an alternative to that of FIG. 5A, showing a first flow device that is coupled to the first gas outlet and a second flow device that is coupled to the second gas outlet.

The one or more flow devices may be controlled electronically by a controller 500 as shown in FIGS. 5A and 5B, or they may be controlled mechanically by a mechanical switch, lever or valve.

Sensor

The apparatus 1 may comprise a sensor for sensing the temperature of the build bed surface. In one example, a thermal camera may be used as a sensor for sensing the temperature of the build bed surface 160 by capturing thermal images of the build bed surface 160.

Further, the apparatus 1 may further comprise a sensor for sensing the temperature of the gas at the first gas inlet 101A and/or at the second gas inlet 101B. The sensor(s) may be located in close proximity to the first gas inlet 101A and/or to the second gas inlet 101B. Moreover, there may be a sensor for sensing the temperature of the gas at or near the first gas outlet 102A and/or at or near the second gas outlet 102B, where "near" means "in close proximity to" (for example a small distance downstream of) the gas outlet 102A and/or 102B.

Any type of sensor such as a thermal camera, thermocouple, Resistance Temperature Detector (RTD) or thermistor may be used to measure the temperature of the build bed surface, gas inlets or gas outlets.

Controller

As shown in FIGS. 5A and 5B, the controller 500 is in communication with the flow devices 210, 211, 212 so as to control the flow rate of the flow devices 210, 211, 212 actively or passively. In a passive control mode, the controller 500 may control the flow rate based on predetermined flow rate values or pre-stored flow rate values in a memory 501 that is coupled to the controller 500. Alternatively, in an active control mode, the controller 500 may be configured to receive a feedback signal from one or more of the various sensors to determine a modified flow rate at each gas outlet so as to improve temperature control of the build bed surface 160.

Further, the controller 500 may control one or more flow devices 210, 211, 212 so as to control a suction flow rate from the first and/or second gas outlets 102A, 102B based on at least one of: the sensed temperature of the build bed surface, the sensed temperature at the first gas inlet 101A and/or the second inlet 101B, or the sensed temperature at the first gas outlet 102A and/or at the second gas outlet 102B. The controller may be configured to control a duty cycle of the one or more flow devices.

In the active control mode, the flow rate may be adjusted or the one or more flow devices may be switched ON or OFF after any one or more of a certain number of layers of particulate material have been deposited, after a certain number of process sequences, after a certain time has elapsed, or after certain temperature within the work space has reached. For example, if the temperature within the work space 100 exceeds a predetermined threshold value, the suction flow rate of the one or more flow devices may be increased so as to convey more cool gas into the work space and remove the excess heat.

Furthermore, based on the process conditions and/or temperature within the work space 100, the controller may switch OFF the one or more flow devices for a certain time or until a certain process condition is met, for example until a desired build bed surface temperature has been achieved within the work space. For example, if the build bed surface temperature falls below a predetermined threshold value, the gas flow is not required to enhance convection of the build bed surface, so the controller may switch OFF the one or more flow devices.

When the one or more flow devices are switched OFF, the controller may provide an alert signal to the user. Based on this, the user may adjust other parameters or devices in the apparatus 1 so as to maintain the desired process conditions or desired build bed surface temperature.

The controller may be a computing device, a microprocessor, an application-specific integrated circuit (ASIC), or any other suitable device to control the one or more flow devices. The controller may be a separate control board or may be a part of the control circuitry of the apparatus that may be configured to control the functions of various components such as the sleds, the radiation source assembly, the roller, or the printhead assembly of the apparatus 1.

Figure 6:
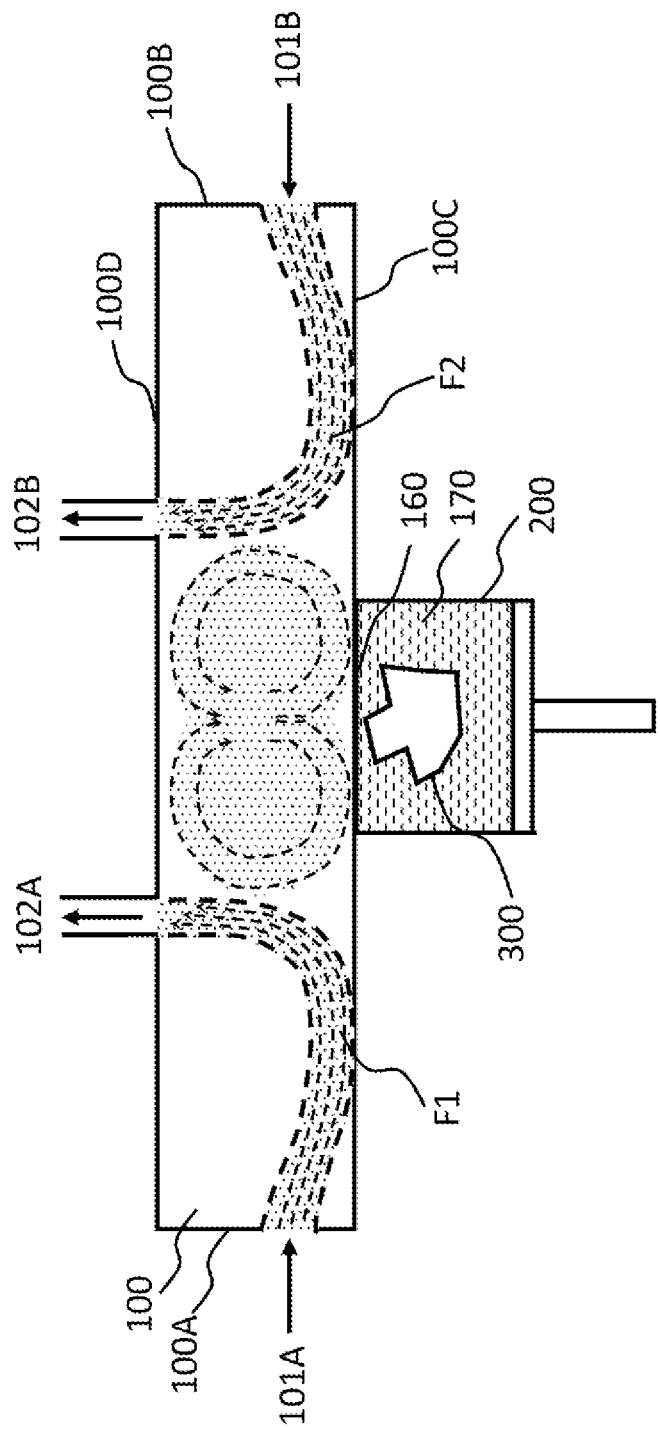
FIG. 6 is a schematic cross-sectional view of the build bed and work space as depicted in FIG. 4, and an illustration of gas flow above the build bed surface.

FIG. 6, which is similar to FIG. 4, additionally shows a gas flow due to convection above the build bed surface 160. The gas flow from the inlets to the respective outlets may be set up so that first and second gas curtains on the first and second sides of the work space 100 create three separate pressure zones within the work space 100: two outer pressure zones between each gas inlet and the respective gas outlet, and an inner/central pressure zone above the build bed surface 160. The gas curtains may be set up effectively by controlling the flow rate at the gas outlets and by arranging the gas outlets e.g. in the form of elongate slots located above either side of the work space 100. FIG. 6 illustrates an upward flow of gas on either side of the work space 100 that has a significant vertical component in the direction of the natural convection flow. It thus enhances the natural convection flow that is set up by the hot build bed surface 160. Within the inner pressure zone, the pressure is lower than in the two outer pressure zones, and due to a fast upward flowing component an upward flow is set up in the inner pressure zone next to each curtain.

The generated three pressure zones may be used to remove excess heat from the work space 100 and also to remove impurities or chemical substances such as evaporating fluid agent, smoke, fumes, exhaust gases and airborne particles from the work space 100. The central pressure zone may experience an updraft along the convection direction thereby enhancing the natural flow of convection.

The properties of the two outer gas flows and the resulting gas curtains need not be of the same shape or flow rate, and depend on the work space design and the respective rates of extraction and flow resistances set up by the inlet and outlet and the intervening flow path.

Therefore, the first gas flow F1 may create a first gas curtain on the first side of the work space 100 and a first pressure zone outward of the first edge 160' of the build bed surface 160, and the second gas flow F2 may create a second gas curtain on the second side of the work space and a second pressure zone outward of the second edge 160" of the build bed surface 160. In some implementations, the first pressure zone and the second pressure zone may have substantially the same pressure. This may ensure that symmetry is maintained within the work space and thus any thermal non-uniformities may be avoided.

Thus, due to the generation of the first and second gas curtains on the first and second sides of the work space 100, first and second pressure zones may be created outward of the first and second edges of the build bed surface 160, and a central pressure zone may be created above the build bed surface 160, as shown in FIG. 6. The central pressure zone may have a pressure lower than the first pressure zone and the second pressure zone. The gas flow in the central region of the build bed surface 160 may have a low flow rate and small volume so as to avoid impact of a downward gas flow on the build bed surface 160 strong enough to cause temperature depressions and disturbance of the layer of particulate material.

Further, the one or more flow devices may be used to control the gas flow rate or suction speed at the gas outlet. For example, the one or more flow devices may be configured to control the flow rate of the gas flow such that each pressure zone has a different pressure, or the first and second zones may have the same pressure. As discussed above, the one or more flow devices may comprise a suction device that is coupled to both or each of the first and second gas outlets 102A, 102B, such that the first and second gas curtains may be created by operating the one or more suction devices to apply suction to the first and second gas outlets 102A, 102B. The one or more suction devices may comprise a fan, or the one or more flow devices may comprise a fan.

It should be appreciated that the suction device is not limited to comprising a fan. Instead, any external source of suction (such as a factory vacuum device) or any known internal source of suction may be used and may be coupled to the gas outlet, for example by a suitable length of tube.

Central Gas Duct

Figure 7:
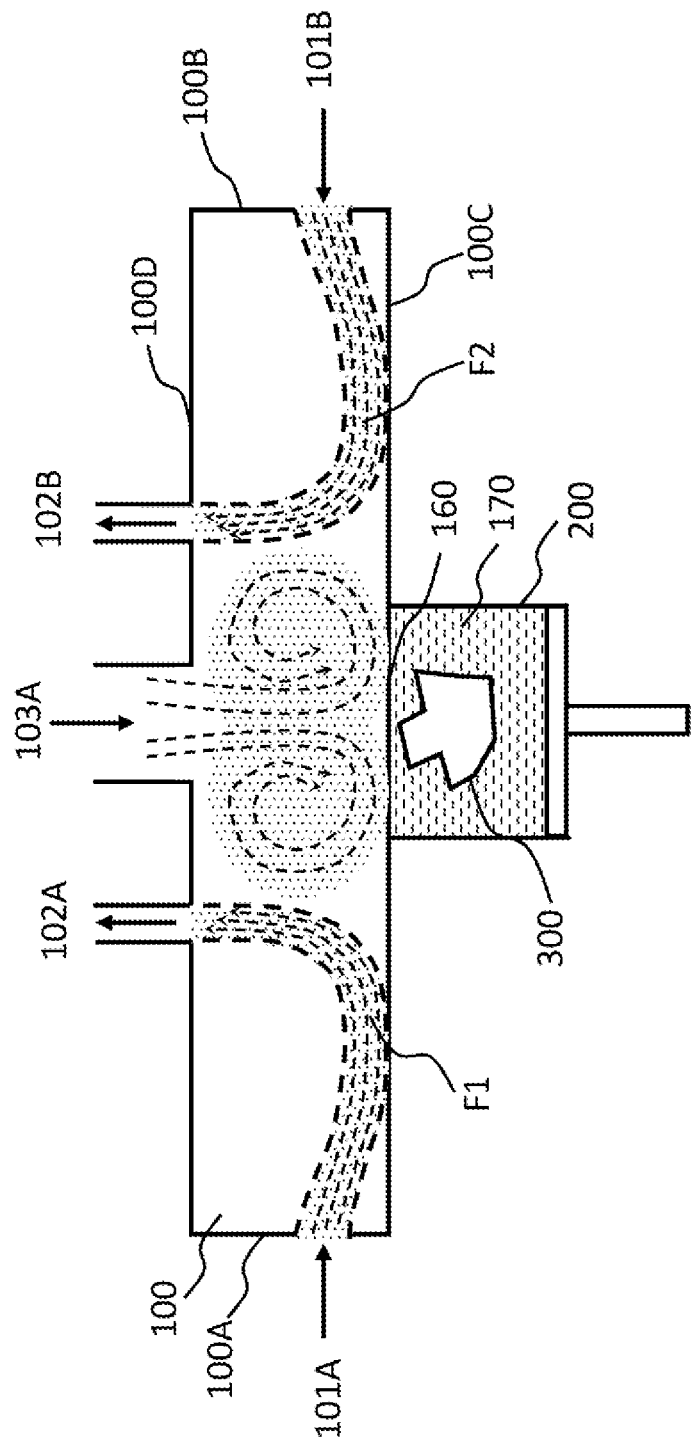
FIG. 7 is a schematic cross-sectional view of the build bed and work space as depicted in FIG. 4, and an arrangement of a gas duct with a downward flow of gas towards the build bed surface.

In another implementation, a central pressure zone may be created by injecting a downward flow of low pressure gas into the work space 100 and may be provided to the build bed surface 160. The temperature of this gas may be lower than the temperature of the gas provided by the first and second gas inlets 102A, 102B. The downward gas flow may be adjusted so as to create a small downward flow of gas to the build bed surface 160. This may provide additional control over the temperature of the build bed surface 160. To provide this downward flow of gas, as shown in FIG. 7, the apparatus 1 may further comprise a gas duct 103A above the build bed surface 160 and one or more inflow devices may be arranged to create a downward flow of low pressure gas from the gas duct 103A towards the build bed surface 160 in use. The one or more inflow devices may adjust the downward flow so as to control the flow rate, velocity and/or volume of the gas flow. This downward flow of gas may create a central or low pressure zone above the build bed surface 160 and can also control the pressure of the central zone. The central pressure zone may be used to a small degree to cool a portion of the build bed surface to make it more uniform thermally, while avoiding generation of dust and temperature non-uniformity. The one or more inflow devices may comprise a fan or an impeller and may be controlled by the controller 500 or by a mechanical switch, lever or valve.

Sleds

In one implementation, the apparatus 1 has two sleds: a distribution sled 130 on which a distribution device such as roller may be mounted, and a print sled 140 on which droplet deposition heads may be mounted.

Figure 8:
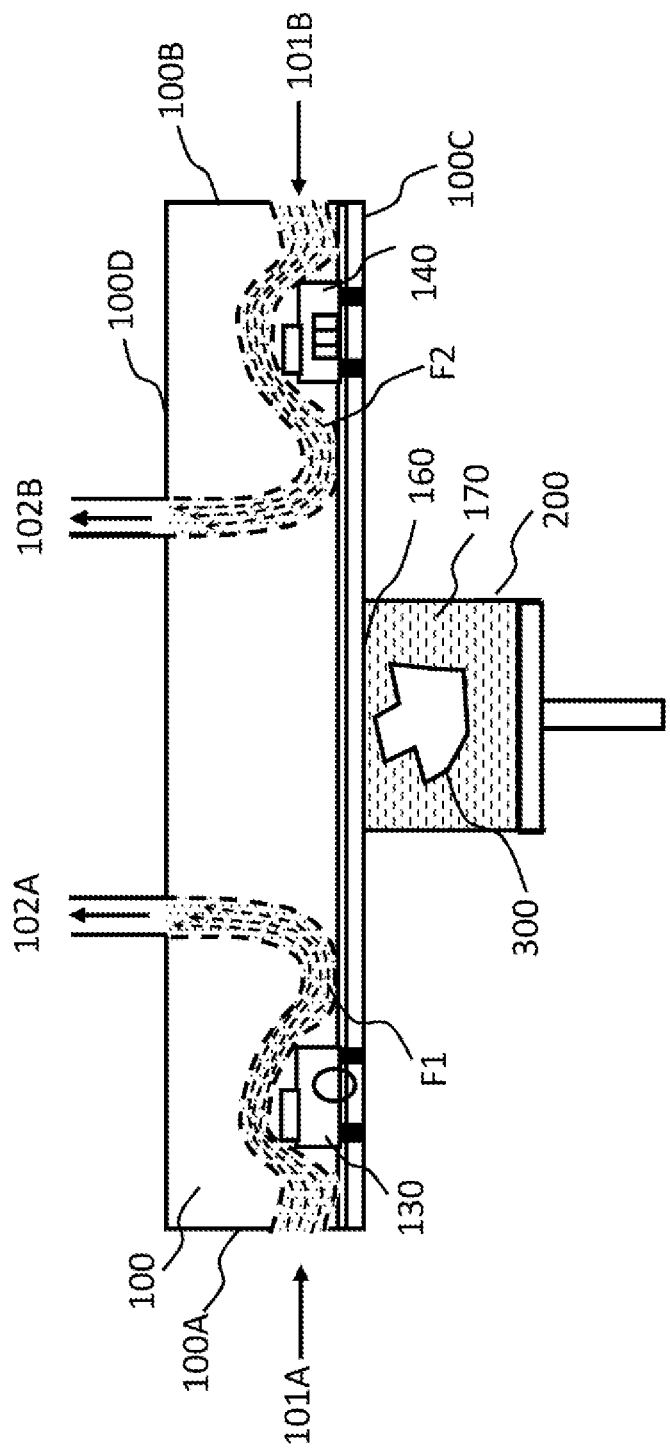
FIG. 8 is a schematic cross-sectional view of the build bed and work space of an apparatus such as that of FIG. 1, and an arrangement of a distribution sled on the first side of the work space and a print sled on the second side of the work space.

The two sleds 130, 140 are shown in FIG. 8 in parking positions on the first and second sides of the work space 100. The sleds 130, 140 may have one or more radiation source assemblies mounted on them, for example one that may be used for pre heating and one that may be used for sintering. Alternatively, the apparatus 1 may have a further sled (not shown) on which a radiation source assembly may be mounted.

During the three-dimensional printing process, the sleds 130, 140 are moved over the build bed surface 160 to perform their functions during the stages of the build process and may be affected by the heat from the nearby radiation source assembly, overhead radiation assembly or by generated heat during process within the work space. During the build process, the radiation source assembly or assemblies raise the temperature of the sled and its components and/or the nearby components at least temporarily in the vicinity of the sled. It is therefore desirable to cool the sleds 130, 140 to avoid any negative impact of heat on their functionality, for example on the reliability of the droplet deposition heads.

Accordingly, the gas flow from the first and/or second gas inlets 101A, 101B may be directed towards the one or more sleds on which a distribution device, droplet deposition head assembly or radiation source assembly is mounted, such that the gas flow cools the one or more sleds. This means that, during operation of the apparatus, the gas flow may be at least temporarily directed towards the one or more sleds as they intermittently reside in the parking position near the gas inlet. The gas flow may be directed towards a sled in the parking position and/or along the path of travel of the sleds. As shown in FIG. 8, the first and second gas inlets 101A, 101B may be provided at the same level above the floor 100C of the work space 100 as that of the sleds, so that the gas flow impacts the sled face and is deflected so that it passes over the top surface and/or along the sides of the sled 130, 140. The gas flow may thus also assist in cooling of the sled 130, 140.

Arrangement with Guiding Elements

In one implementation of the apparatus 1, the apparatus may comprise one or more guiding elements 400 that may be arranged between the first and/or second gas inlet 101A, 101B and the build bed surface 160, for guiding the gas flow from the first and/or second gas inlet 101A, 101B to the respective first and/or second gas outlet 102A, 102B. One or more guiding elements may be arranged on the first and/or second sides of the work space 100. This arrangement may reduce strong gas flow components directed towards the build bed surface 160. Moreover, the guiding elements may direct the gas flow and define the path of the gas flow such that the temperature and velocity of the gas flow may be controlled, for example by restricting the free space into which the gas flow may otherwise disperse. The guiding elements may be arranged as a fixed structure or alternatively may be arranged as a movable structure so as to guide the gas flow as they are repositioned, for example dynamically during a build process.

Figure 9:
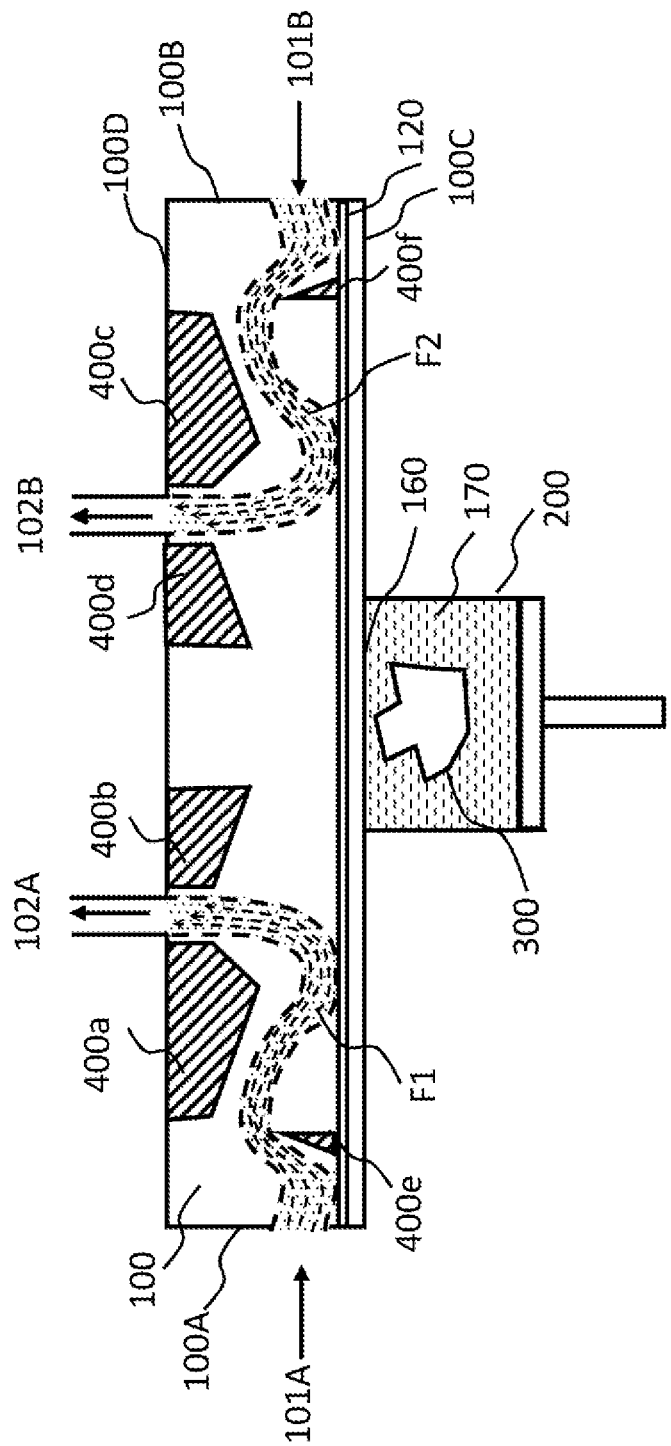
FIG. 9 is a schematic cross-sectional view of the build bed and work space of an apparatus such as that of FIG. 1, and an arrangement of various guiding element(s) in the work space.

In one implementation shown in FIG. 9, guiding elements 400a-400f are arranged at the first and second sides of the work space 100. Four guiding elements 400a, 400b, 400c, 400d are arranged to protrude from the ceiling 100D of the workspace, with two guiding elements 400a, 400b on the first side of the work space 100 and two guiding elements 400c, 400d on the second side of the work space 100. The guiding elements restrict the free space over which the flow can disperse. As can be seen in the example in FIG. 9, some of the guiding elements 400e, 400f extend to within close proximity of the floor 100C of the work space 100, for example half way or more than half way of the distance from the ceiling to the level of the build bed surface. Optionally, the guiding elements 400e, 400f may be located on the rails 120 on which the sleds 130, 140 are mounted. Alternatively, the guiding elements 400e, 400f may be located outside the area of the rails 120 or between the rails 120. In these cases, the parking position of the sleds 130, 140 may be shifted appropriately towards the build bed surface.

The guiding elements 400a-400d protruding from the ceiling 100D of the work space 100 may be fixed to the ceiling 100D as a fixed structure or alternatively they may be coupled to the ceiling 100D via mechanical moveable linkages.

Furthermore, the guiding elements 400a-400f may be arranged so as to guide the gas flow in such a way that the formation of the gas curtains can be enhanced, for example the guiding elements near the outlets may direct the gas flow to follow an upward direction for at least an upper half of the distance between the ceiling 100D and the build bed surface 160. Additionally or instead, the guiding elements may be arranged so that the gas flow reaches to the floor 100C of the work space and to the gas outlet without reaching the build bed surface. Instead of angling the inlet, a guiding element may be used to deflect the flow upon entering the working space. As shown in FIG. 9, the gas flows F1, F2 are first deflected by a guiding element 400e, 400f respectively located near the gas inlets 101A, 101B so as to direct the gas flow towards the ceiling 100D of the work space 100 so as to cool the hot areas of the ceiling, then the second guiding elements 400a, 400c located at or near the ceiling 100D respectively direct the gas flow towards the floor 100C of the work space 100. Next, the guiding elements 400a, 400b, 400c, 400d located near the gas outlets 102A, 102B redirect the respective gas flows F1, F2 towards the respective gas outlets 102A, 102B. With this type of arrangement of guiding elements 400a-400f, a high volume gas flow can be maintained over a defined flow path. For example, the guiding elements 400e, 400f guide the gas flow such that the gas flow F1, F2 is deflected to the ceiling of the work space to cool any hot areas in the ceiling of the work space, and then before extracting the gas flow through the gas outlets 102A, 102B the gas flow F1, F2 is deflected from the ceiling 100D of the work space 100 to the floor 100C of the work space 100 by the guiding elements 400a, 400c so as to cool the build bed surface 160 and also to flow across the sleds and remove excess heat from the sled surfaces. In this way, the gas flow may be forced along a path in the work space 100 such that it passes over the hottest areas on the first and second side of the work space, before extraction.

The guiding elements may be positioned symmetrically about the section A-A' so as to enhance gas flow symmetry on the first and second sides of the work space 100, for example in arrangements where the rates of extraction and the respective flow paths of the first and second sides are substantially equal.

In one example, the guiding element(s) may comprise one or more baffles or one or more protrusions from the side wall or from the floor of the work space. The baffles may direct the gas flow towards the respective gas outlets 102A, 102B. The baffles may be arranged between the first and/or second edges of the build bed surface 160 and the first and/or second gas inlets 101A, 101B. Alternatively, the baffle may be arranged at or near the first and/or second gas inlet 101A, 101B. The baffle may be formed by a vertical or angled plate, with respect to the level of the build bed surface 160.

In another example, the guiding elements may comprise one or more valves or vanes. Optionally, there may be one or more guiding elements on each side of the work space depending on the height of the work space, the distance between gas inlet and gas outlet, the gas flow velocity, and number of elements/devices (e.g. sleds, roller, dosing blade to dose particulate material to the work surface, etc.) between the build bed surface and the side wall.

It should be noted that the arrangement of guiding elements in FIG. 9 is for illustrative purpose only, and other arrangements may be envisaged that achieve the effect of directing the gas flow.

Furthermore, as the guiding elements restrict the path of the gas flow, they help to control the gas flow velocity by increasing the speed of gas flow for a fixed rate of suction and to increase the temperature exchange with the hotter surfaces adjacent the restricted path. Additionally, the guiding structures may be formed of thermally conductive material so as to remove heat from the gas flow as it passes.

In another implementation, the distribution sled 130 and/or the print sled 140 may function as a dynamic guiding element. As shown in FIG. 8, when the distribution sled 130 and the print sled 140 are at the parking position, the gas flow may be deflected by the sleds 130, 140 such that the gas flow passes over the sleds may partially be deflected to the ceiling of the work space, then flow down to the floor of the work space and be directed back by the floor of the work space and the outlets 102A, 102B towards the ceiling.

In further implementation shown in FIGS. 10A-10B, the gas inlets 101A, 101B may be coupled to the gas outlets 102A, 102B via a flexible tube or a pipe which may function as a guiding element to guide the gas flow. The flexible tube may be fully perforated or partially perforated, or otherwise cut away in places. For example, FIG. 10A shows the first gas inlet 101A and the first gas outlet 102A coupled by a partially perforated tube 410, with the perforated part of tube 410 facing towards the build bed surface 160 such that the gas flow may enter the work space 100 closer to the build bed surface through the perforations of the tube 410 so as to cool the build bed surface 160. The perforated part of the tube 410 may be joined to a solid part near the first gas outlet 102A so as to guide the gas flow towards the first gas outlet 102A.

FIG. 10B shows another variant of a flexible tube 420 in which the flexible tube incorporates a slot in the tube wall, through which slot gas may enter the work space. The first gas inlet 101A and the first gas outlet 101B are coupled by the slotted tube 420 and the slot faces towards the build bed surface 160 such that the gas flow may enter the work space closer to the build bed surface 160 through the slot of the tube 420 so as to cool the build bed surface 160.

It should be noted that FIGS. 10A-10B depict arrangements of different flexible tubes or pipes at the first side of the work space, only for illustration. However, the second side of the work space may be a mirror-image of the first side of the work space for symmetry of the gas flow. For example, a perforated tube 410 can be used on both the first and second sides of the build bed surface 160, or a slotted tube 420 can be used on both the first and second sides of the build bed surface 160. Alternatively, a combination of the perforated tube 410 and the slotted tube 420 may be used in the work space 100—for example, the perforated tube 410 may be arranged on the first side of the work space 100 while the slotted tube 420 may be arranged on the second side of the work space 100.

As shown in FIGS. 3(*a*) to 3(*h*) above, in some variants the gas outlet 102A may face downwards towards the floor 100C of the work space 100 or towards the work surface 190. In some of these variants, one or more of the gas outlets may be arranged facing downwards and towards the respective gas inlets, and the geometry of the gas outlet may depend on the geometry of the gas inlet. With these arrangements, a non-turbulent flow path may be created between the gas inlet and the respective gas outlet.

Figure 11:
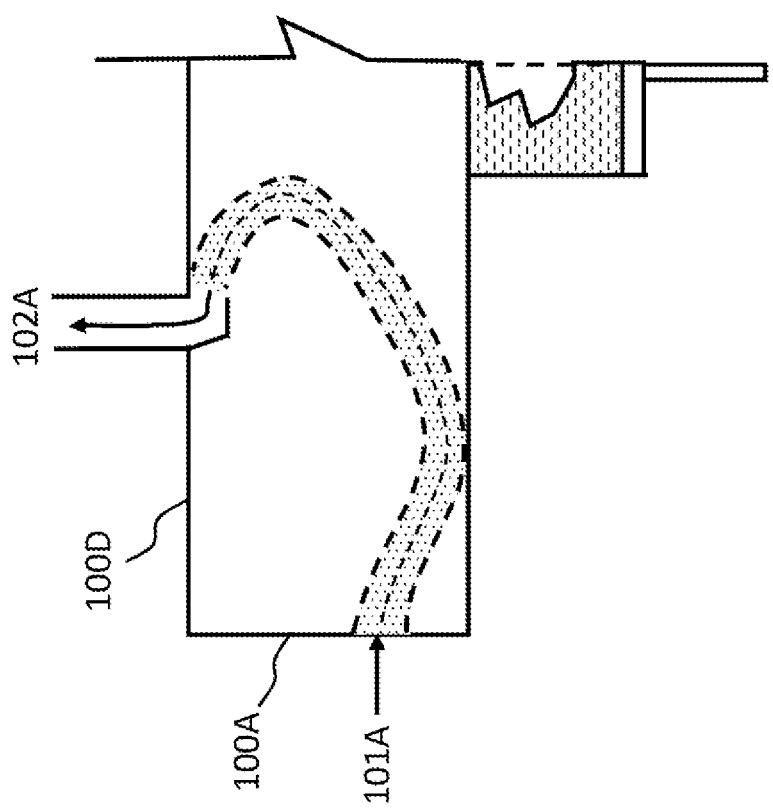
FIG. 11 is a schematic cross-sectional view of a first side of a work space such as that of FIG. 1, showing a further alternative arrangement and geometry of the first gas outlet.

However, in another variant as depicted in FIG. 11, the gas outlet 102A may protrude from the ceiling 100D of the work space 100 and into the work space 100, and the gas outlet 102A may face sideways towards the side wall 100B of the work space 100. With such an arrangement on each side of the work space 100, the flow paths on the first and second sides of the build bed surface 160 may be created such that the gas is forced towards the centre of the work space and the flow path comes close to the edge of the build bed surface 160 before exiting through the gas outlet, thus resulting in efficient cooling of the build bed surface. This arrangement leads to a more intricate flow path between the gas inlet and the respective gas outlet. For this variant, it may be advantageous to arrange the gas outlet between the gas inlet and the build bed surface (i.e. away from the edge of the build bed surface) so that the flow path will not disturb the particulate material on the build bed surface. It should be noted that in FIG. 11, the protrusion is shown with one angled side. However, the protrusion is not limited to this shape, and it may have any shape with the opening on the side facing towards the opposite side wall of the work space (i.e. towards the side wall which is opposite to the side wall comprising the respective gas inlet 101A). Moreover, the geometry of the protrusion may be designed according to the required flow path profile.

General Considerations

The reference to "gas" in this disclosure may incorporate atmospheric air, inert gas, nitrogen, a combination of these gases, or any gas that may be compatible with the three-dimensional printing process.

It should be appreciated that even though a single gas inlet at or near the side wall of the work space has been depicted in the Figures, the invention is not limited to this and any number of gas inlets as required can be envisaged. Moreover, the gas inlets may be simple holes or apertures on the side walls of the work space, and there could be a plurality of holes of different (or same) sizes on the side walls of the work space.

Further, the gas may be provided to the gas inlets naturally, such that each inlet is in direct communication with the atmospheric air. Alternatively, the gas may be provided to the gas inlets using a flow device such as a fan or impeller to draw gas into the gas inlets. In another example, the gas may be delivered to the gas inlets using an external gas supply device such as a gas cylinder, with the gas being supplied from the gas cylinder to the gas inlet at elevated pressure.

Also, it should be noted that, even though a single gas outlet at one side of the work space has been depicted in the Figures, the invention is not limited to this and any number of gas outlets as required can be envisaged.

The invention claimed is:

1. An apparatus for manufacturing a three-dimensional object from particulate material, the apparatus comprising:
    a work space bounded by a floor, a ceiling, a first side wall on a first side of the work space, and a second side wall on a second side of the work space, the first side wall opposing the second side wall;
    a build bed having a build bed surface, the build bed surface being comprised in the floor of the work space and having a first edge on the first side of the work space, towards the first side wall, and a second edge on the second side of the work space, towards the second side wall;
    a first gas inlet at or near the first side wall;
    a second gas inlet at or near the second side wall;
    a first gas outlet located in the ceiling of the work space, wherein, in a projective view, the position of the first gas outlet is coincident with the first edge of the build bed surface, or is between the first edge of the build bed surface and the first gas inlet; and
    a second gas outlet located in the ceiling of the work space, wherein, in a projective view, the position of the second gas outlet is coincident with the second edge of the build bed surface, or is between the second edge of the build bed surface and the second gas inlet;
    wherein the first gas outlet is positioned higher in the work space than the first gas inlet, and the second gas outlet is positioned higher in the work space than the second gas inlet; and
    wherein the first and second gas outlets are coupled to—or wherein the apparatus comprises, coupled to the first and second gas outlets—one or more flow devices operable to create first and second gas flows between the first gas inlet and the first gas outlet, and between the second gas inlet and the second gas outlet, respectively, such as to create respective first and second gas curtains on the first and second sides of the work space in use.

2. The apparatus according to claim 1, wherein the first and the second gas outlets are elongate slots respectively extending, in a projective view, along the length of the first and second edges of the build bed surface.

3. The apparatus according to claim 1, wherein, in use, the first gas flow creates a first pressure zone outward of the first edge of the build bed surface, and the second gas flow creates a second pressure zone outward of the second edge of the build bed surface.

4. The apparatus according to claim 1, further comprising a gas duct above the build bed surface and one or more inflow devices arranged to create a downward flow from the gas duct towards the build bed surface in use, wherein the downward flow is of lower pressure than the first and second gas flows.

5. The apparatus according to claim 1, wherein the one or more flow devices comprises a suction device that is coupled to both the first and second gas outlets, such that, in use, the first and second gas curtains are created by the suction device applying suction to the first and second gas outlets.

6. The apparatus according to claim 1, wherein the one or more flow devices comprise a first suction device that is coupled to the first gas outlet and a second suction device that is coupled to the second gas outlet.

7. The apparatus according to claim 1, wherein the first and second gas outlets are arranged facing downwards towards the floor of the work space.

8. The apparatus according to claim 1, wherein the first and second gas outlets are arranged symmetrically about a build bed axis.

9. The apparatus according to claim 1, further comprising one or more guiding elements arranged between the first and/or second gas inlet and the build bed surface, for guiding the gas flow from the first and/or second gas inlet to the respective first and/or second gas outlet so as to reduce strong gas flow components directed towards the build bed surface.

10. The apparatus according to claim 9, wherein the guiding elements are arranged on the first and/or second sides of the work space.

11. An apparatus for manufacturing a three-dimensional object from particulate material, the apparatus comprising:
a work space bounded by a floor, a ceiling, a first side wall on a first side of the work space, and a second side wall on a second side of the work space, the first side wall opposing the second side wall;
a build bed having a build bed surface, the build bed surface being comprised in the floor of the work space and having a first edge on the first side of the work space, towards the first side wall, and a second edge on the second side of the work space, towards the second side wall;
a first gas inlet at or near the first side wall;
a second gas inlet at or near the second side wall;
a first gas outlet in the ceiling of the work space, and
a second gas outlet in the ceiling of the work space;
wherein the first and second gas outlets are elongate slots respectively extending, in a projective view, along the length of the first and second edges of the build bed surface;
wherein the first gas outlet is positioned higher in the work space than the first gas inlet, and the second gas outlet is positioned higher in the work space than the second gas inlet;
wherein a first suction device is coupled to the first gas outlet and a second suction device is coupled to the second gas outlet, each suction device being operable to create a respective first and second gas flow from the first gas inlet to the first gas outlet, and from the second gas inlet to the second gas outlet, respectively, such as to create respective first and second gas curtains on the first and second sides of the work space, the first gas flow creating a first pressure zone outward of the first edge of the build bed surface, and the second gas flow creating a second pressure zone outward of the second edge of the build bed surface;
according to and wherein the apparatus further comprises a sensor for sensing the temperature of the build bed surface.

12. The apparatus according to claim 1, further comprising at least one of:
a sensor for sensing the temperature of the build bed surface;
a sensor for sensing the temperature of the gas at the first gas inlet;
a sensor for sensing the temperature of the gas at the second gas inlet;
a sensor for sensing the temperature of the gas at the first gas outlet; and
sensor for sensing the temperature of the gas at the second gas outlet; and
a controller for controlling the one or more flow devices so as to control a suction flow rate from the first and/or second gas outlets based on at least one of:
the sensed temperature of the build bed surface;
the sensed temperature at the first gas inlet;
the sensed temperature at the second gas inlet;
the sensed temperature at the first gas outlet; and
the sensed temperature at the second gas outlet.

13. A method for operating an apparatus for manufacturing a three-dimensional object from particulate material, the apparatus comprising:
a work space bounded by a ceiling, a floor, a first side wall on a first side of the work space, and a second side wall on a second side of the work space, the first side wall opposing the second side wall;
a build bed having a build bed surface, the build bed surface being comprised in the floor of the work space and having a first edge on the first side of the work space, towards the first side wall, and a second edge on the second side of the work space, towards the second side wall;
a first gas inlet at or near the first side wall;
a second gas inlet at or near the second side wall;
a first gas outlet in the ceiling of the work space, wherein, in a projective view, the position of the first gas outlet is coincident with the first edge of the build bed surface, or is between the first edge of the build bed surface and the first gas inlet; and
a second gas outlet in the ceiling of the work space, wherein, in a projective view, the position of the second gas outlet is coincident with the second edge of the build bed surface, or is between the second edge of the build bed surface and the second gas inlet;
wherein the first gas outlet is positioned higher in the work space than the first gas inlet, and the second gas outlet is positioned higher in the work space than the second gas inlet;
the method comprising:
operating the one or more flow devices to create first and second gas flows between the first gas inlet and the first gas outlet, and between the second gas inlet and the second gas outlet, respectively, such as to create respective first and second gas curtains on the first and second sides of the work space.

14. The method according to claim 13, wherein the first gas flow creates a first pressure zone outward of the first edge of the build bed surface, and the second gas flow creates a second pressure zone outward of the second edge of the build bed surface.

15. The method according to claim 14, wherein the first pressure zone and the second pressure zone have substantially the same pressure.

16. The method according to claim 13, further comprising applying suction to the first and second gas outlets to create the first and second gas curtains so as to create the first and second gas flows from the first gas inlet to the first gas outlet, and from the second gas inlet to the second gas outlet, respectively.

17. The method according to claim 13, further comprising at least one of:

sensing the temperature of the build bed surface;
sensing the temperature of the gas at the first gas inlet;
sensing the temperature of the gas at the second gas inlet;
sensing the temperature of the gas at the first gas outlet; and
sensing the temperature of the gas at the second gas outlet; and
   controlling the one or more flow devices so as to control a suction flow rate at one or both of the first and second gas outlets based on at least one of:
   the sensed temperature of the build bed surface,
   the sensed temperature at the first gas inlet;
   the sensed temperature at the second gas inlet;
   the sensed temperature at the first gas outlet; and
   the sensed temperature at the second gas outlet.

18. The method according to claim 13, further comprising directing the gas flow towards one or more sleds on which a distribution device, a droplet deposition head assembly or a radiation source assembly is mounted, such that the gas flow cools the one or more sleds.

19. The apparatus according to claim 11, further comprising at least one of:

a sensor for sensing the temperature of the gas at the first gas inlet;
a sensor for sensing the temperature of the gas at the second gas inlet;
a sensor for sensing the temperature of the gas at the first gas outlet; and
a sensor for sensing the temperature of the gas at the second gas outlet; and
   a controller for controlling one or both of the first and second suction devices so as to control a suction flow rate from the first and/or second gas outlets based on at least one of:
   the sensed temperature of the build bed surface;
   the sensed temperature at the first gas inlet;
   the sensed temperature at the second gas inlet;
   the sensed temperature at the first gas outlet; and
   the sensed temperature at the second gas outlet.

20. The apparatus according to claim 1, wherein the one or more flow devices comprises a common flow device that is coupled to both the first and second gas outlets such that, in use, the first and second gas curtains are created by the common flow device.

* * * * *